[19] United States Patent
Mays et al.

[15] 3,645,226
[45] Feb. 29, 1972

[54] INDICATOR MECHANISMS

[72] Inventors: Michael Richard Mays; Philip Norman Paginton, both of London, England

[73] Assignee: Westinghouse Brake and Signal Company, Limited, London, England

[22] Filed: Aug. 10, 1970

[21] Appl. No.: 62,552

[30] Foreign Application Priority Data

Sept. 19, 1969 Great Britain......................46,247/69

[52] U.S. Cl....................................116/70, 60/52, 73/419, 251/297
[51] Int. Cl.......................................................G01l 19/12
[58] Field of Search..................60/52; 116/70, 117; 188/1 A, 188/106 F, 151; 251/297, 73; 73/419

[56] References Cited

UNITED STATES PATENTS

| | | | |
|---|---|---|---|
| 2,583,539 | 1/1952 | Bashark et al. | 251/297 X |
| 3,018,786 | 1/1962 | Stratton | 251/297 X |
| 3,145,570 | 8/1964 | Grandstaff | 73/419 |
| 3,182,630 | 5/1965 | Claeys | 116/70 |
| 3,358,446 | 12/1967 | Wortz | 188/1 A X |
| 3,442,134 | 5/1969 | Bennett et al. | 73/419 |
| 3,480,333 | 11/1969 | Stelzer | 116/70 X |

Primary Examiner—Louis J. Capozi
Attorney—Larson, Taylor and Hinds

EXEMPLARY CLAIM

1. An indicator mechanism having a detent element movable from either one of two positions through an intermediate third position, the element being resiliently loaded so as to detent into any one of the positions with which it becomes aligned, two resilient means each exerting a force opposing that exerted by the other resilient means, the force exerted by one of the means urging the element towards one of said two positions and the force exerted by the other of the means urging the element towards the other of said two positions, two force-increasing means one associated with each of the resilient means whereby the force exerted by the associated resilient means can be caused to increase to a value sufficient to overcome the combination of the force exerted by the other of the resilient means and the resilient loading of the element when it is detented in that one of said two positions from which the associated resilient means is urging the element towards the other of the two positions, the intermediate third position being so located that before the element reaches said other of the two positions it becomes aligned with and detents into the third position from which third position it can be released to continue its movement to said other of the two positions only by the application to the element of an opposing force sufficient to overcome the resilient loading on the element.

10 Claims, 2 Drawing Figures

PATENTED FEB 29 1972　　　　　　　　　　　　　　3,645,226

INDICATOR MECHANISMS

This invention relates to indicator mechanisms and more particularly, although not exclusively, to fluid-operated indicator mechanism.

The present invention provides an indicator mechanism having a detent element movable from either one of two positions through an intermediate third position, the element being resiliently loaded so as to detent into any one of the positions with which it becomes aligned, two resilient means each exerting a force opposing that exerted by the other resilient means, the force exerted by one of the means urging the element towards one of said two positions and the force exerted by the other of the means urging the element towards the other of the said two positions, two force-increasing means one associated with each of the resilient means whereby the force exerted by the associated resilient means can be caused to increase to a value sufficient to overcome the combination of the force exerted by the other of the resilient means and the resilient loading of the element when it is detented in that one of said two positions from which the associated resilient means is urging the element towards the other of the two positions, the intermediate third position being so located that before the element reaches said other of the two positions it becomes aligned with and detents into the third position from which third position it can be released to continue its movement to said other of the two positions only by the application to the element of an opposing force sufficient to overcome the resilient loading on the element.

The resilient loading on the element may be provided by a compression spring extending between the element and guide means by which the element is guided for movement between said two positions.

The element may have a tapered end portion and at each of said two positions there may be located a detent which is of such a size that the tapered end portion enters the detent only to an extent less than the length of said portion whereas at the third position there is a detent of such a size that the element enters the detent at said third position to an extent which is greater than the length of said portion.

The force-increasing means may each comprise a piston-and-cylinder arrangement by the application to which of fluid pressure the force exerted by the associated resilient means is caused to increase to said value.

The resilient means may each comprise a compression spring which springs are aligned one on each of opposed sides of the element in the direction of movement of the element between said two portions. With this arrangement and where the force-increasing means each comprises a piston-and-cylinder arrangement as above specified, the application of fluid pressure to the piston-and-cylinder arrangement may cause further compression of the associated compression spring. In this case, the cylinder of the arrangements may constitute part of a housing of the mechanism and the pistons may be hollow and accommodate one end of the associated compression spring.

Said opposing force may be that generated by the piston-and-cylinder arrangement upon the application thereto of a fluid-pressure.

The indicator may have visual means connected for movement with the element whereby the position of the element is visually indicated.

When the force-increasing means each comprises a piston-and-cylinder arrangement as above specified and said opposing force is that generated by a piston-and-cylinder arrangement also as above specified, the fluid pressures applied to the piston-and-cylinder arrangements comprising the force-increasing means may be those one on each side of a double-acting piston-and-cylinder operator and the fluid pressure which generates the opposing force may be that on the relief side of a pair of pressure-relief valves connected one to each side of a double-acting piston-and-cylinder operator. The double-acting piston-and-cylinder operator may be the actuator of a hydraulic handbrake.

One embodiment of the present invention will now be described in greater detail, by way of example only, with reference to the accompanying drawings of which:

Figure 1:
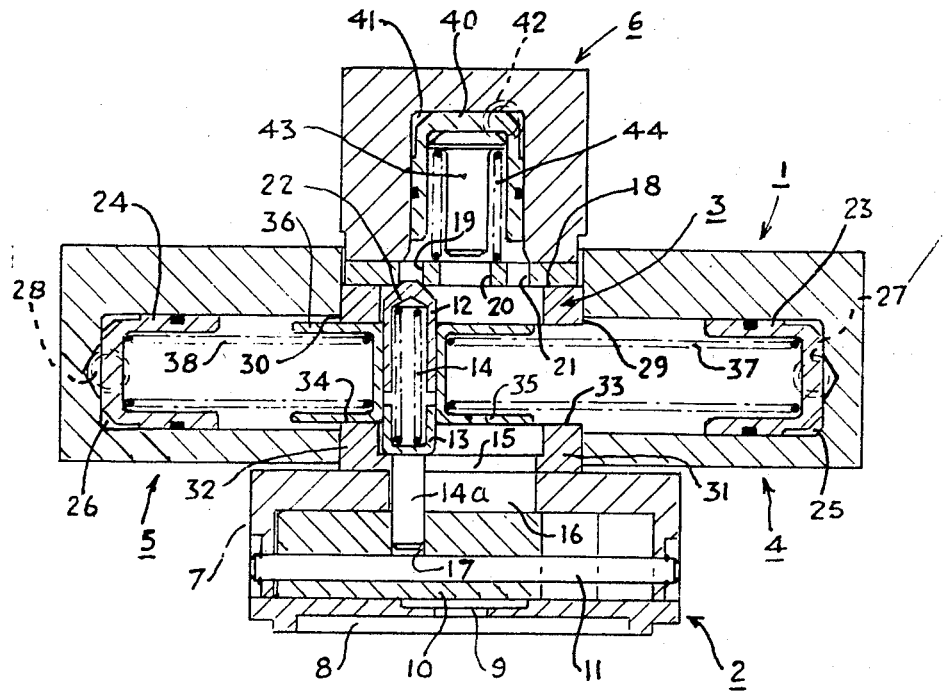
FIG. 1 is a cross-sectional view of the indicator mechanism.

Referring, firstly, to FIG. 1, there is here shown an indicator mechanism 1 which comprises five housing parts 2 to 6.

The housing part 2 is comprised by a boxlike portion 7 of which the "lid" 8 is formed with a window 9. Enclosed in the housing part 2 is a slidable visual indicator 10 which is guided for movement both by the interior surfaces of the part 2 and by a rod 11 extending across the interior of the part 2.

Mounted above the part 2 (as seen in FIG. 1) is the housing part 3 which accommodates a detent element or plunger 12 between which and guide means 13 for the element 12, extends a compression spring 14 accommodated within the element 12 and the guide means 13. The guide means 13 carries a spigot 14a through a guide slot 15 in the part 3 and a similar guide slot 16 in the part 2, to project into a bore 17 in the indicator 10. By this arrangement, any movement of the element 12 in the direction in which it is guided by the spigot 14 riding in the slots 15 and 16, will be transmitted to the visual indicator 10. The top (as viewed in FIG. 1) of the housing part 3 is closed by a plate 18 having therein three apertures 19, 20 and 21. As can be seen from FIG. 1, the upper end portion (as viewed in FIG. 1) of the element 12 is tapered at 22 and the size of the apertures 19 and 21 are such that the tapered end portion 22 of the element 12 is not permitted fully to enter the respective aperture whereas the size of the aperture 20 is such that there is no such restriction on the plunger 12 which, when it is in its midposition as herein after described, the plunger 12 can enter the aperture 20 to a distance greater than the length of the tapered end portion 22 of the plunger 12. Arranged one on each side of the housing part 3 are the housing parts 4 and 5 which are of similar construction. Each housing part 4 and 5 constitutes the cylinder of a piston-and-cylinder arrangement of which the piston is indicated as 23 and 24 respectively. The piston together with the respective housing part defines a chamber 25 and 26 respectively into which opens the respective port 27 and 28. The travel of the pistons 23 and 24 inwardly of the mechanism towards the housing part 3 is limited by shoulders 29 and 30 respectively provided by the outer faces of the housing part 3. In the sidewalls 31 and 32 which carry the shoulders 29 and 30 respectively, there are bores 33 and 34 in which slide connected cup-shaped abutments 35 and 36 through which extends the element 12. Resilient compression springs 37 and 38 extend respectively between the abutment 35 and the piston 23 and the abutment 36 and the piston 24. Mounted on top (as viewed in FIG. 1) of the housing part 3 on the side of the plate 18 remote from the interior of the housing part 3, is the housing part 6 which also constitutes the cylinder of a piston-and-cylinder arrangement of which the piston is indicated by reference 40. The piston 40 and the cylinder constituted by the housing part 6 together define a chamber 41 into which opens a port 42. Inside the piston 40 is a push-rod 43 resiliently urged into engagement with the piston 40 by spring 44 which also acts as the return spring for the piston 40. The piston-rod 43 is aligned with the aperture 20 in the plate 18.

The mechanism above described operates as follows:

The various parts of the mechanism are shown in FIG. 1 in one of its two extreme positions; the other of its extreme positions is when the detent element 12 is engaged with the aperture 21 in the plate 18.

It will be seen that the spring 38 resiliently urges the detent element 12 to the right (as viewed in FIG. 1) towards the other of the extreme positions of the element 12 whereas the spring 37 (when the element 12 is in that other of its extreme positions) will urge the element 12 in a direction towards the position which the element 12 has as shown in FIG. 1. Neither of the springs 37 and 38 are sufficiently strong (in their conditions as shown in FIG. 1) to overcome the resilient loading provided by the spring 14 on the element 12 so that the element 12 is thus held (as shown in FIG. 1) in the respective one of its extreme positions.

Starting from the position shown in FIG. 1 of the various parts, the application of fluid pressure to the port 28 will pressurize the chamber 26 and move the piston 24 against the spring 38, to the right. Such movement of the piston 24 will further compress the spring 38 and will, therefore, cause the force exerted by that spring on the element 12 to be increased and, in fact, this force will increase to such an extent that it will overcome the resilient loading provided by the spring 14 on the element 12 so that the interaction of the element 12 and the aperture 19 no longer serves to detent the element 12 in its position as shown in FIG. 1. As soon as the element 12 is freed from being so detented in position, the force exerted by the spring 38 will overcome that exerted by the opposing spring 37 and the element 12 (guided by the guide means 13) will move to the right.

The element 12, will however, be prevented from reaching the other of its extreme positions by virtue of the fact that as soon as the element 12 becomes aligned with the aperture 20, the spring 14 will drive the element 12 into the aperture 20 in what may be termed the third position of the element 12.

Irrespective of any further right-hand movement of the piston 24 possibly even further to compress the spring 38, as the element 12 will have entered the aperture 20 to a distance greater than the length of the tapered end portion 22 of the element 12, the force exerted by the spring 28 cannot force the element 12 any further to the right and, particularly, cannot force the element 12 out of its detented position in the aperture 20. Hence, the element 12 (and, therefore, the visual indicator 10) will be held in the intermediate position.

The element 12 (and the visual indicator 10) can only be released from this position by the application of fluid pressure to the port 42. Such application of fluid pressure will pressurize the chamber 41 and move the piston 40 downwardly (as viewed in FIG. 1) to engage the piston-rod 43 with the upper end (as viewed in FIG. 1) of the element 12. Subsequent to such engagement, further movement of the piston 40 through the piston-rod 43, will push the element 12 out of detented engagement with the aperture 20 thus freeing the element 12 (and the visual indicator 10) to move further to the right to its other extreme position in which the element 12 will detent into the aperture 21.

From this other extreme position, the operation is the reverse of that above described in that pressurization of the chamber 25 by the application of fluid pressure to port 27, will compress the spring 37 (as was the spring 38 compressed by the application of fluid pressure to the port 28) and in the absence of fluid pressure at the port 28 the mechanism will operate in the reverse direction to that above described.

Figure 2:
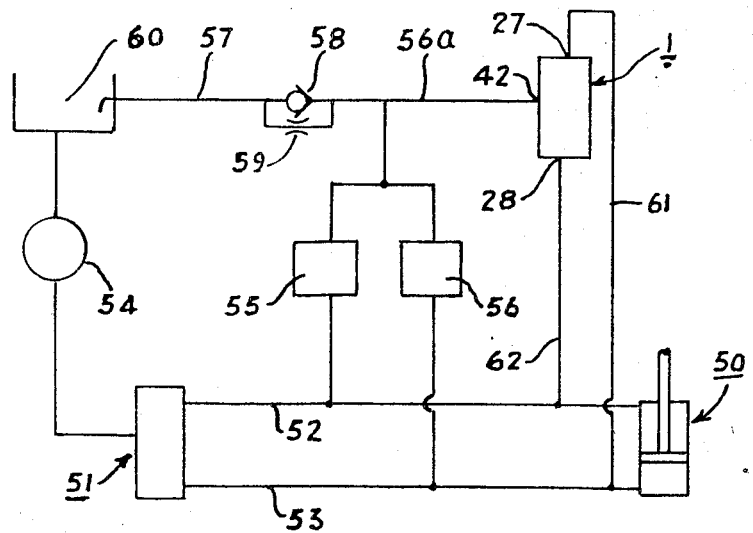
FIG. 2 shows schematically an hydraulic circuit for operating the mechanism of FIG. 1.

The above-described indicator mechanism 1 is particularly, although not exclusively, applicable to hydraulic handbrake circuits one version of which is shown in the accompanying FIG. 2.

In this FIG. 2, the hydraulic handbrake actuator is indicated symbolically by the piston-and-cylinder arrangement 50 and, as is well known, would be constituted by a double-acting piston-and-cylinder arrangement.

The operation of the actuator 50 is controlled by a directional control valve 51 having two outputs 52 and 53 connected one to each side of the actuator 50. The directional control valve 51 is arranged to be fed with hydraulic fluid under pressure by a pump 54 and the valve is operable to apply this received hydraulic pressure selectively to the line 52 or 53. Connected to the lines 52 and 53 are pressure-relief valves 55 and 56 respectively of which the relief outputs are connected to a line 56a. The line 56a, in one direction, is connected to a line 57 there being interposed between the lines 56a and 57 in parallel one with the other, a check valve 58 and a choke 59. The line 57 acts as a return line to a reservoir 60 from which the pump 54 draws its hydraulic fluid. The indicator mechanism 1 is connected in the above-described circuit with the pipe 56a connected to the port 42 and the ports 27 and 28 of the mechanism 1 being connected via lines 61 and 62 to the lines 53 and 52 respectively.

With the pump 54 operative to supply hydraulic fluid under pressure to the directional control valve 51, this valve 51 can be operated to apply that pressure to either of the lines 52 and 53. If the valve 51 is operated to apply the pressure to the line 52, for example, the double-acting piston-and-cylinder arrangement (i.e., the actuator of the hydraulic handbrake) will be operated in one direction (as shown in FIG. 2), downwardly and the pressure in the line 52 will be applied over line 62 to the port 28 of the mechanism 1 thus to move the element 12 (and the visual indicator 10) from its position as shown in FIG. 1 to its intermediate third position where, as above described, it will be there held for the time being. As the pressure in the line 52 builds up (due to further downward movement of the piston of the actuator 50 being now prevented) a stage will be reached at which the relief valve 55 will operate at its preset pressure so that a pressure signal will now appear on the line 56a. This signal will be applied to the port 42 to operate the mechanism as above described to free the element 12 from being detented in the midposition thus freeing it to move to the other of the extreme positions of the element 12 in which it detents in the aperture 21.

By reversal of the direction of operation of the actuator 50 (by suitable operation of the directional control valve 51) the line 52 will be depressurized and the hydraulic pressure will now be applied to the line 53. The application of pressure to the line 53 will move the piston of the actuator 50 in the direction opposite to its previous movement and, also, will apply over the line 61 the hydraulic pressure to the port 27. Such application to the port 27 will, as above described, cause the element 12 to move to the left again to its midposition in which it will be detented and held until, again, the pressure in the pipe 53 builds up to a value at which the pressure-relief valve 56 will operate and, again, by its operation apply an hydraulic pressure on the line 56a which, in turn, will be applied to the port 42. Again, application of the hydraulic pressure to the port 42 will, as above described, again release the element 12 from its detented position in the aperture 20 thus freeing it to be moved to its position shown in FIG. 1.

While, in the above-described embodiment, the force generated by the springs 37 and 38 are enhanced by force-increasing means constituted by the pistons 23 and 24 and the housing parts 4 and 5 respectively, other force-increasing means could be used. For example, these means may be constituted by electromagnetic means which could operate further to compress the springs 37 and 38.

Likewise, the piston-and-cylinder arrangement provided by the piston 40 and the housing part 6 could be replaced by other means; again, for example, by some electromagnetic means.

While, in the above-described embodiment, a visual indication is given as to the position of the element 12, this indication may be other than visual and, moreover, the indication may be used to operate actuating mechanism. For example, the respective position of the element 12 could be used to trigger any suitable mechanism.

Having thus described our invention what we claim is:

1. An indicator mechanism having a detent element movable from either one of two positions through an intermediate third position, the element being resiliently loaded so as to detent into any one of the positions with which it becomes aligned, two resilient means each exerting a force opposing that exerted by the other resilient means, the force exerted by one of the means urging the element towards one of said two positions and the force exerted by the other of the means urging the element towards the other of said two positions, two force-increasing means associated with each of the resilient means whereby the force exerted by the associated resilient means can be caused to increase to a value sufficient to overcome the combination of the force exerted by the other of the resilient means and the resilient loading of the element when it is detented in that one of said two positions from which the associated resilient means is urging the element towards the other of the two positions, the intermediate third position being so located that before the element reaches said other of the two positions it becomes aligned with and detents into the third position from which third position it can be released to continue its movement to said other of the two positions only by the application to the element of an opposing force sufficient to overcome the resilient loading on the element.

2. An indicator mechanism as claimed in claim 1, wherein the resilient loading on the element is provided by a compression spring extending between the element and guide means by which the element is guided for movement between said two positions.

3. An indicator mechanism as claimed in claim 1, wherein the element has a tapered end portion and at each of said two positions there is located a detent which is of such a size that the tapered end portion enters the detent only to an extent less than the length of said portion whereas at the third position there is a detent of such a size that the element enters the detent at said third position to an extent which is greater than the length of said portion.

4. An indicator mechanism as claimed in claim 1, wherein the force-increasing means each comprises a piston-and-cylinder arrangement by the application to which of fluid pressure the force exerted by the associated resilient means is caused to increase to said value.

5. An indicator mechanism as claimed in claim 3, wherein the resilient means may each comprise a compression spring which springs are aligned one on each of opposed sides of the element in the direction of movement of the element between said two positions.

6. An indicator mechanism as claimed in claim 5, wherein, the application of fluid pressure to the said piston-and-cylinder arrangement causing further compression of the associated compression spring.

7. An indicator mechanism as claimed in claim 6, wherein the cylinder of the arrangements constitute part of a housing of the mechanism and the pistons are hollow and accommodate one end of the associated compression spring.

8. An indicator mechanism as claimed in claim 4, wherein said opposing force is that generated by the piston-and-cylinder arrangement upon the application thereto of a fluid pressure.

9. An indicator mechanism as claimed in claim 8, wherein the indicator has visual means connected for movement with the element whereby the position of the element is visually indicated.

10. An indicator mechanism as claimed in claim 9, wherein the fluid pressures which apply to the piston-and-cylinder arrangement comprising the force-increasing means are those one on each side of a double-acting piston-and-cylinder operator and the fluid pressure which generates the opposing force is that on the relief side of a pair of pressure-relief valves connected one to each side of the double-acting piston-and-cylinder operator.

* * * * *